(12) United States Patent
Kitagawa et al.

(10) Patent No.: US 12,490,221 B2
(45) Date of Patent: Dec. 2, 2025

(54) SYSTEM, METHOD, DEVICE, AND PROGRAM FOR POSITIONING ACCURACY WITH INTER-DEVICE COORDINATION

(71) Applicant: RAKUTEN MOBILE, INC., Tokyo (JP)

(72) Inventors: Koichiro Kitagawa, Tokyo (JP); Awn Muhammad, Tokyo (JP); Krishna Kesavan, San Mateo, CA (US); Pankaj Shete, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/917,851

(22) PCT Filed: Apr. 28, 2022

(86) PCT No.: PCT/US2022/026737
§ 371 (c)(1),
(2) Date: Oct. 7, 2022

(87) PCT Pub. No.: WO2023/211450
PCT Pub. Date: Nov. 2, 2023

(65) Prior Publication Data
US 2024/0397465 A1    Nov. 28, 2024

(51) Int. Cl.
*H04W 64/00* (2009.01)
*H04L 5/00* (2006.01)
*H04W 92/18* (2009.01)

(52) U.S. Cl.
CPC ........... *H04W 64/00* (2013.01); *H04L 5/0048* (2013.01); *H04W 92/18* (2013.01)

(58) Field of Classification Search
CPC .... H04W 64/00; H04W 92/18; H04L 5/0048; G06N 20/00; G01S 2205/02; G01S 5/0278; G01S 5/0072
See application file for complete search history.

(56) References Cited

U.S. PATENT DOCUMENTS

2019/0223140 A1* 7/2019 Grossmann ......... G01S 5/02585
2019/0230618 A1* 7/2019 Saur .................... H04W 56/001
(Continued)

FOREIGN PATENT DOCUMENTS

WO    2022/031661 A1    2/2022
WO    2022/034483 A2    2/2022

OTHER PUBLICATIONS

International Search Report for PCT/US2022/026737 dated Jul. 27, 2022.
(Continued)

*Primary Examiner* — Umair Ahsan
(74) *Attorney, Agent, or Firm* — Sughrue Mion, PLLC

(57) ABSTRACT

A method for adaptive positioning accuracy of devices in a telecommunication network may be provided. The method may be performed by one or more processors and may include transmitting, by a network element of the telecommunication network to a user device, a positioning trigger signal and a positioning reference signal; transmitting, by a user premise equipment to the user device, a sidelink reference signal to the user device; receiving, by the network element, a ranging result report, the ranging result report calculated by the user device including a distance and a timing information associated with signals received by the user device; and transmitting, by the network element to a core network element of the telecommunication network, a position of the user device, wherein the position of the user device is based on a machine learned location inference model and the ranging result report.

18 Claims, 10 Drawing Sheets

(56) References Cited

U.S. PATENT DOCUMENTS

| | | | |
|---|---|---|---|
| 2020/0028648 | A1 | 1/2020 | Akkarakaran et al. |
| 2022/0014872 | A1 | 1/2022 | Balasubramanian et al. |
| 2022/0065978 | A1 | 3/2022 | Manolakos et al. |
| 2022/0077990 | A1 | 3/2022 | Bao et al. |
| 2023/0037704 | A1* | 2/2023 | Hirzallah ............ H04W 64/006 |
| 2023/0232361 | A1* | 7/2023 | Hirzallah ............. G01S 5/0278 |
| | | | 370/329 |
| 2024/0085517 | A1* | 3/2024 | Duan ................... H04W 4/026 |

OTHER PUBLICATIONS

Written Opinion for PCT/US2022/026737 dated Jul. 27, 2022.
Cewit, "Views on study of sidelink based positioning in Rel.18", 3GPP TSG RAN_Rel-18 Workshop RWS-210491, 2021, (12 pages).
Zte, "Discussion on items led by RAN2 for NR positioning", 3GPP TSG RAN WG1 #105-e R1-2104595, May10-27, 2021, pp. 1-5 (5 pages).

* cited by examiner

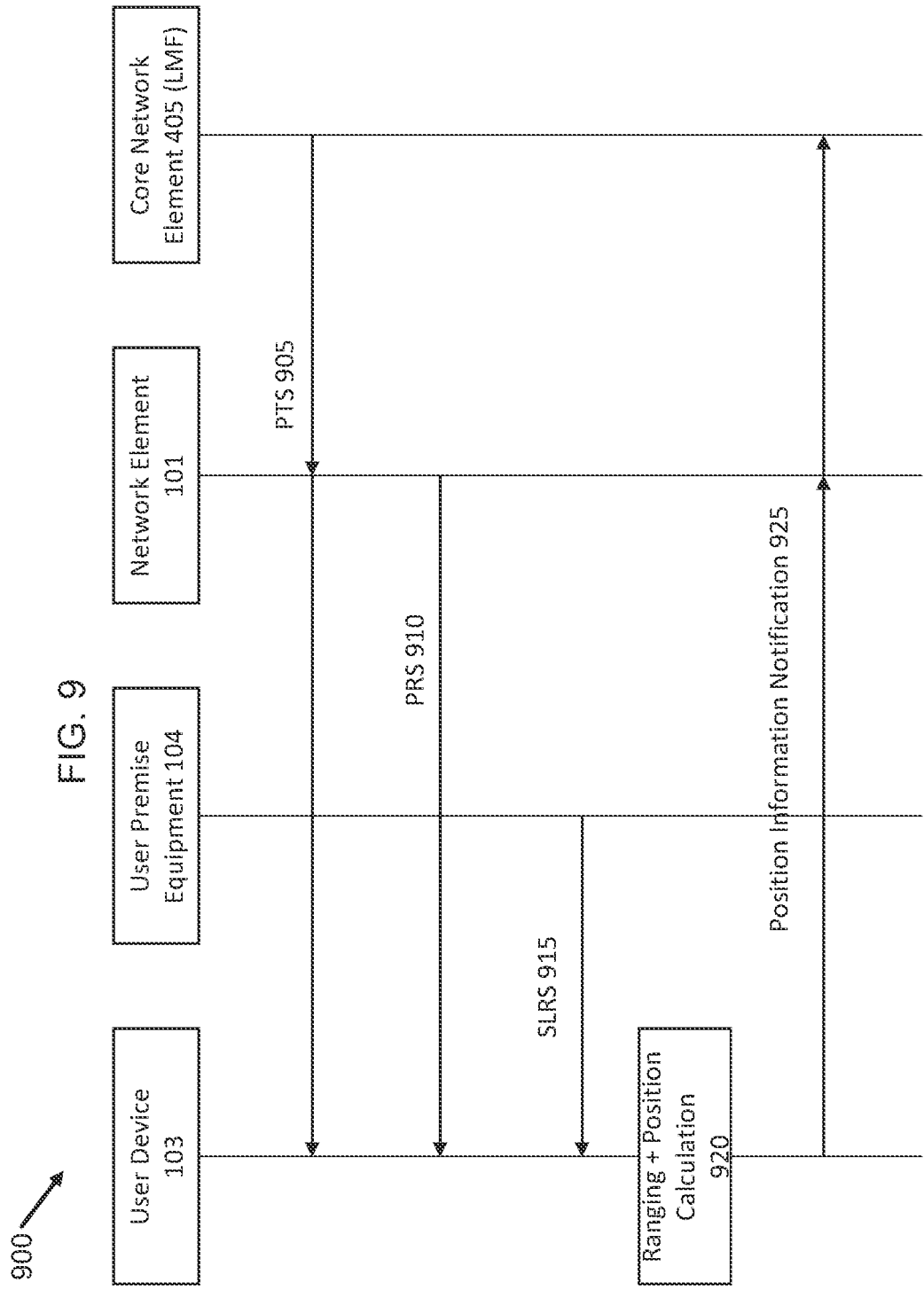

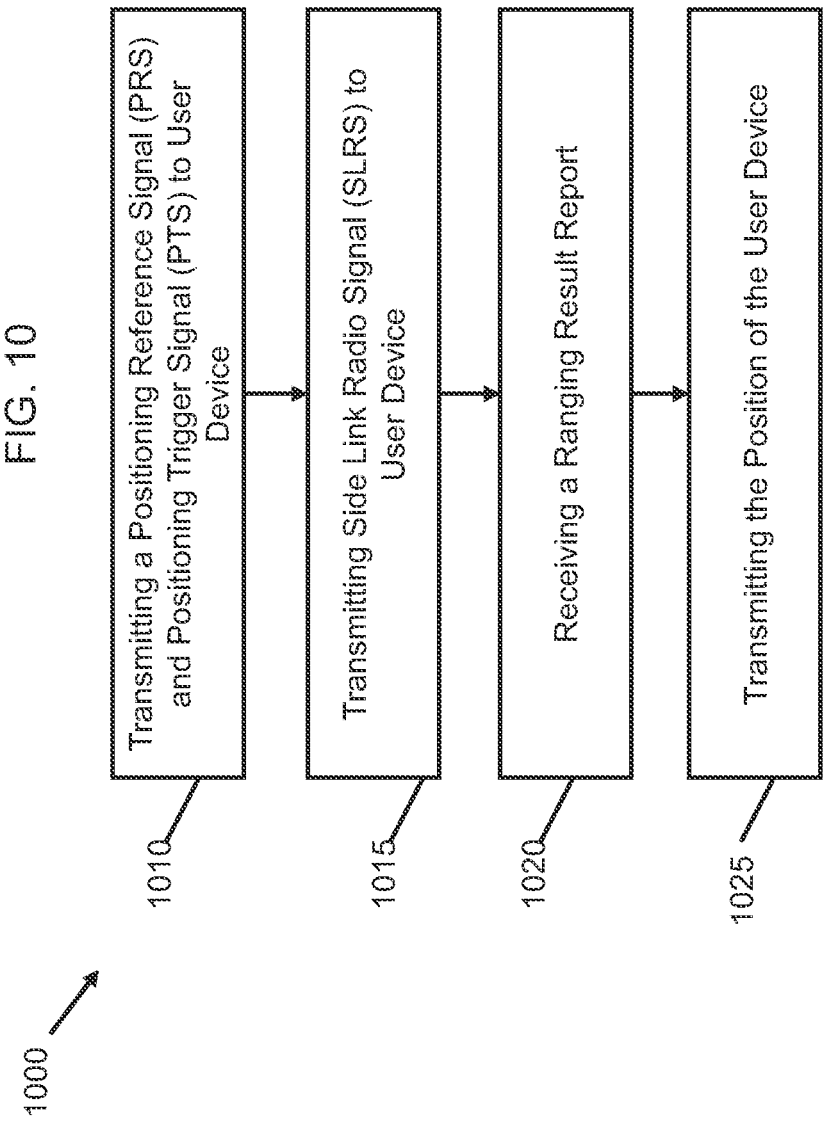

SYSTEM, METHOD, DEVICE, AND PROGRAM FOR POSITIONING ACCURACY WITH INTER-DEVICE COORDINATION

CROSS REFERENCE TO RELATED APPLICATIONS

This application is a National Stage of International Application No. PCT/US2022/026737 filed Apr. 28, 2022.

FIELD OF THE INVENTION

The present disclosure relates to estimating the position of one or more user devices or automated guided vehicles in a telecommunication network and/or wireless network. In particular, the present disclosure relates to a method, apparatus, and system for estimating the position of the one or more user devices or automated guided vehicles in a telecommunication network and/or wireless network.

BACKGROUND OF THE INVENTION

In a telecommunication network, accurate measurement of the position of the devices is very important for continuous and efficient provision of network services. Determining the position of user devices, autonomous guided vehicles, or portable network devices often uses line of sight (LOS) based signaling methods. Such methods may be sufficient in outdoor areas where a LOS signal may be easily transmitted or received. However, in areas where LOS signal may be harder to transmit, such as indoor areas or outdoor areas with obstacles, methods that use LOS signaling may be highly error prone.

Therefore, methods for increasing positioning accuracy for user devices or automated guided vehicles that may not be in the telecommunication network's line of sight are needed.

Telecommunication networks are increasingly relying on cloud computing and artificial intelligence methods to cope with expansion of services, customers, and areas of operations. However, there has been no significant research to study how artificial intelligence methods may be leveraged to improve position accuracy of user devices, especially in areas where line of sight is hard to find.

SUMMARY

According to embodiments, a method for adaptive positioning accuracy of devices in a telecommunication network may be provided. The method may be performed by one or more processors and may include transmitting, by a network element of the telecommunication network to a user device, a positioning trigger signal and a positioning reference signal; transmitting, by a user premise equipment to the user device, a sidelink reference signal to the user device; receiving, by the network element, a ranging result report, the ranging result report calculated by the user device including a distance and a timing information associated with signals received by the user device; and transmitting, by the network element to a core network element of the telecommunication network, a position of the user device, wherein the position of the user device is based on a machine learned location inference model and the ranging result report.

According to embodiments, an apparatus for adaptive positioning accuracy of devices in a telecommunication network may be provided. The apparatus may include at least one memory configured to store computer program code; and at least one processor configured to access the computer program code and operate as instructed by the computer program code. The program may include first transmitting code configured to cause a first processor of the at least one processor to transmit a positioning trigger signal and a positioning reference signal, the first processor being a part of a network element; second transmitting code configured to cause a second processor of the at least one processor to transmit a sidelink reference signal to a user device, the second processor being a part of a user premise equipment; first receiving code configured to cause the first processor to receive a ranging result report, the ranging result report calculated by the user device including a distance and a timing information associated with signals received by the user device; and third transmitting code configured to cause the first processor to transmit a position of the user device, wherein the position of the use device is based on a machine learned location inference model and the ranging result report.

According to embodiments, a non-transitory computer readable medium may be provided. The non-transitory computer readable medium may store a program causing a computer to execute a process. The process may include transmitting, by a network element of a telecommunication network to a user device, a positioning trigger signal and a positioning reference signal; transmitting, by a user premise equipment to the user device, a sidelink reference signal to the user device; receiving, by the network element, a ranging result report, the ranging result report calculated by the user device including a distance and a timing information associated with signals received by the user device; and transmitting, by the network element to a core network element of the telecommunication network, a position of the user device, wherein the position of the user device is based on a machine learned location inference model and the ranging result report.

BRIEF DESCRIPTION OF THE DRAWINGS

Features, advantages, and significance of exemplary embodiments of the disclosure will be described below with reference to the accompanying drawings, in which like signs denote like elements.

FIG. 9 is an example workflow diagram illustrating an example process for determining the position of a user device in a telecommunication network, according to embodiments of the present disclosure.

FIG. 10 is an exemplary flowchart illustrating an example process for determining the position of a user device in a telecommunication network, according to embodiments of the present disclosure.

DETAILED DESCRIPTION

Figure 1:
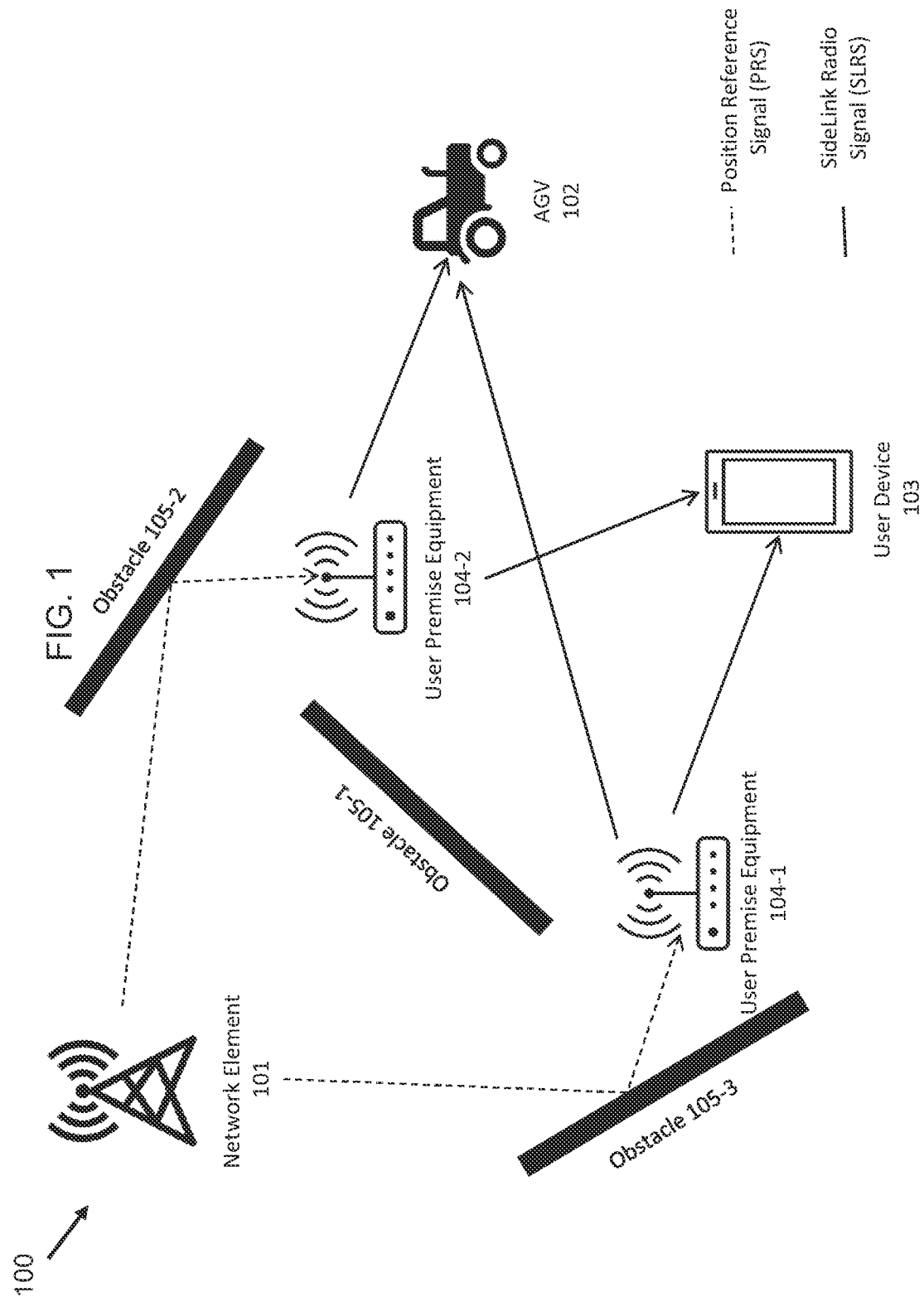
FIG. 1 is an example diagrammatic illustration of a network architecture in which the systems and/or methods described in the present disclosure may be implemented.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

As stated above, accurate positioning of user devices and network devices is important to provide continuous and efficient service to the users of the telecommunication networks. Determining the position of devices that may not always be in line of sight (LOS) of the telecommunication network, for example, devices located in indoor areas, or located in areas with obstacles, is very error prone because of the lack of LOS signaling. The Position Reference Signal (PRS) may be primarily used by a network element (e.g., gNodeB, eNodeB, centralized unit, distributed unit) to determine the position of the user device. The PRS travels in a straight line, and may be redirected or reoriented when it bounces off a surface. This redirection often renders the relative time and distance measures of the PRS inaccurate. The inaccuracy results in disruptive provisioning of services to some customers, reducing customer satisfaction and increasing the inefficiency of the telecommunication network. Therefore, a method or system that may be used in either LOS conditions or no line of sight (NLOS) conditions is needed.

Using artificial intelligence methods to analyze various aspects of the telecommunication network has greatly increased the efficiency of the telecommunication networks. However, such artificial intelligence techniques have yet to be leveraged for real-time positioning of user equipment in a telecommunication network. Therefore, methods and systems, especially those that leverage artificial intelligence, may be needed in the context of determining the position of network devices and/or user equipment in a telecommunication system.

Embodiments of the present disclosure relate to an adaptive method of determining a real-time position of user equipment, especially in areas where there may be many obstacles that make using PRS is difficult. As stated above, PRS is a position referencing signal that supports downlink/uplink positioning. According to embodiments, the position of user equipment may be determined using a combination of one or more PRS from one or more network elements and sidelink reference signals (SLRS) from one or more network devices whose location is known.

The one or more network devices whose location is known may include local network devices that provide network services. As an example, network devices may include user premise equipment or fixed wireless access equipment which are largely affixed at locations close to users. In areas where using PRS is difficult because the network elements are not in the LOS of user devices, fixed position network devices whose position is known may be used to determine the position of the user equipment. A relative position of the user equipment from a fixed position network device may be used to determine the relative position of the user equipment with respect to the fixed position network device. This relative position of the user equipment may then be used to find the position of the user equipment with respect to the network element (e.g., gNodeB) by adjusting for the relative position of the network device with respect to the network element. The position of the user equipment may then be used to provide continuous and efficient service to the user equipment, even when the user device may not be within the LOS of the network element.

According to some embodiments of the present disclosure, the adaptive method of determining the position of a user device may include using a machine-learned and customizable location inference model. The location inference model may use a plurality of artificial intelligence methods to determine an accurate position of the user device. The location inference model may be trained at a core network element or a central processor of the telecommunication network. The machine learned location inference model may be deployed to infer the location of user equipment at a regional processor (e.g., network element) or even the user equipment itself. Transferring the location inference model to a network element or to the user equipment may reduce transmission lag, transmission overhead, and increase the overall efficiency of process when determining the position of user equipment in the telecommunication network. The transferring of the location inference model, solely for inference, to the network element or the user equipment may also allow for detailed customization of the local inference models of the location inference model while preserving user privacy. Essentially, having local inference models of the machine learned location inference model at the network element or the user equipment may provide more accurate and secure positioning of the user equipment by taking into consideration the specific patterns of the local network.

Embodiments of the present disclosure may allow for real-time updates to the position and/or location of user equipment or network devices such as automated guided vehicles (AGV) or internet of things (IoT) enabled devices efficiently without straining the resources of the telecommunication network.

FIG. 1 is an exemplary illustration of a network architecture 100 in which the systems and/or methods described in the present disclosure may be implemented.

As shown in FIG. 1, a telecommunication network 100 may include a network element 101, one or more obstacle 105 (e.g., 105-1, 105-2, and 105-3), one or more user premise equipment 104 (e.g., 104-1 and 104-2), one or more user equipment such as a user device 103, and an AGV 102. As shown in FIG. 1, the telecommunication network 100 may be located in an environment that includes a plurality of obstacles (obstacle 105). The obstacles may make it difficult for direct LOS communication or positioning between the equipment (user device 103 or AGV 102) and the network element 101.

According to embodiments of the present disclosure, network element 101 may determine the position and/or location of user equipment to provide network services in telecommunication network continuously and efficiently. The network element may include any facility or equipment used to provision network services in the telecommunication network. As an example, network element 101 may include cell towers, cell sites, base stations (e.g., gNodeB, eNodeB, central unit or distributed unit, E-UTRA cell, etc.). In some embodiments, if real-time position of the user equipment may be required, the network element 101 may periodically update or adaptively update the position of the user equipment. As an example, when media may be streamed to or form the user device 103, knowing the position of the user equipment may improve the efficiency of media exchange between the network element 101 and user device 103.

To determine or update the position of user equipment, the network element may use LOS signaling methods. As an example, the network element may use a PRS to determine or update the position of the user equipment. Any known protocol may be used to define and configure the PRS. As an example, the New Radio Positioning Protocol A (NRPPa) may be used to define and configure the PRS. In some embodiments, the PRS definition or configuration may include positioning frequency layers, resource sets, and sequence ID. In some embodiments, the PRS definition or configuration may include a PRS positioning frequency layer that may include a collection of PRS resource sets with each PRS resource set defining a collection of PRS resources. In some embodiments, the PRS definition or configuration may include may include slot configuration parameters and plot a carrier grid in a slot level to highlight the slots in which PRS resource sets are present. The slots may refer to specific spaces in a radio frame and the slot configuration parameters may include a higher layer sequence ID that may be mapped to a specific slot. According to some embodiments, the PRS may be used to transmit or determine timing information associated with the PRS being received or transmitted by the user device using observed time difference of arrival (OTDOA) parameters of the signal.

The environment of the user equipment may include a plurality of obstacles that may block the direct path between the network element and user equipment. Obstacles may include man-made obstacles such as walls, buildings, etc., or natural obstacles such as trees, mountains, hills, etc.

As mentioned above, the network element may use PRS to determine the position of the user equipment. However, PRS requires direct LOS, and the presence of obstacles that block the LOS between the network element and user equipment may cause errors when determining the position of the user device. As an example, in FIG. 1, the user device 103 may not be in the LOS of the network element 101 because of obstacle 105-1. Thus, when the network element broadcasts the PRS, the signal may largely bounce back after colliding with obstacle 105-1 or be diverted after colliding with obstacle 105-3. Even if the PRS, after colliding with obstacle 105-3 reaches and communicates with user device 103, the distance and directionality calculated based on the path of the PRS may be erroneous.

The telecommunication network may include one or more user premise equipment. The user premise equipment may include any equipment that provides services associated with the telecommunication network such as telephones, modems, routers, wireless access point devices, adapters for network devices, local area network (LAN), wide area network (WAN) devices, etc. As an example, in the telecommunication network 100, the user premise equipment 104 (e.g., user premise equipment 104-1 or 104-2) may be routers, modems, or fixed wireless access devices.

According to embodiments of the present disclosure, user premise equipment may be located at either a fixed position or a position and/or location known to the telecommunication network. User premise equipment may communicate other network devices or user equipment using sidelink reference signal (SLRS) without going through the network element. As an example, first user premise equipment 104-1 and second user premise equipment 104-2 may communicate with each other, the user device 103, and AGV 102 directly using SLRS without going through the network element 101. The SLRS may be used to measure the distance between the user equipment and the user premise equipment based on reference signal received power (RSRP), received signal strength indicator (RSSI), reference signal received quality (RSRQ), and/or beam information. In some embodiments, the user equipment may generate a ranging result report based on the SLRS. Any suitable or known protocol may be used to define and configure the SLRS. In some embodiments, the user premise equipment may report the distance and/or directionality between the user premise equipment and the user equipment to the network element or the core network element. As stated above, a combination of the SLRS and the PRS may be used to determine the position of the user equipment. To combine information from both the PRS and SLRS when determining the position of the user equipment, the user premise equipment may correlate the respective PRS and the respective SLRS associated with the user equipment. In some embodiments, the ranging result report may be based on the SLRS and the associated/correlated PRS. As an example, an SLRS may be correlated with a PRS, e.g., the signals may be associated with a same time of location measurement, based on a first transaction ID associated with the PRS being the same as a second transaction ID associated with the SLRS.

According to some embodiments, the ranging result report may include one or more of a time lag between transmission and receipt of the SLRS between the user equipment and the user premise equipment, position information related to the user premise equipment, power information related to the user equipment, power information related to the user premise equipment, time of arrival of the SLRS, or angle information related to a reception of the SLRS. In some embodiments, the ranging result report may include signal information related to the PRS, including at least one of a sequence ID information related to the PRS and beam index as received by the user equipment related to the PRS.

The telecommunication network may include one or more user equipment. User equipment may be any user device that utilizes the services provided by the telecommunication network. Examples of user equipment may include industrial Internet of things (IIoT) devices (e.g., smart sensors, etc), personal computing devices, user mobile devices, a user internet of things enabled (IoT) device, automated guided vehicles (e.g., drones, special purpose robots, autonomous cars, etc.). As examples, in the telecommunication network 100, user equipment may include the user device 103 and AGV 102. In some embodiments, user equipment may be controlled by the users of the telecommunication network to use network services or by operators of the telecommunication network to maintain the telecommunication network.

In an example embodiment, the first user premise equipment 104-1 or the second user premise equipment 104-2 may use SLRS to determine the distance and/or directionality between the first user premise equipment 104-1 or the second user premise equipment 104-2 and the user device 103 and the AGV 102 based on the RSRP, RSSI, RSRQ, and/or beam information from the received SLRS.

According to embodiments of the present disclosure, a core network element of the telecommunication may be used to determine the position of the user equipment in a LOS or NLOS setting. The core network element may include central processing unit responsible for providing critical functions in the telecommunication network. Critical functions may include maintaining subscriber information, call switching, service authentication, and/or location services. In some embodiments, the core network element may trigger the process to determine the position of the user equipment. The network element may transmit the PRS to the user equipment upon receiving a positioning trigger signal from the core network element. Generally, since the core network element provides critical functions, it has robust computing capabilities (more storage, faster processors, more data, etc.) as compared to the network element. Therefore, in some embodiments, the core network element may be used by a location management function to train and/or deploy a model to infer the position of the user equipment. The location management function may use the core network element to train the location inference model with data from throughout the telecommunication network to leverage the robust computing resources of the core network element.

In some embodiments, the telecommunication network may include a location management function (LMF) that may train and deploy a machine learned location inference model that determines the position of the user equipment. The LMF may train the location inference model with data from throughout the telecommunication network. In some embodiments, the LMF may train the location inference model for adaptive indoor positioning of the user equipment. According to embodiments of the present disclosure, the training data for training the location inference model may include SLRS measurements, estimated positioning of the user equipment, position of the user premise equipment, the PRS, sounding reference signal, and the timing information associated with the signals received by the user equipment.

In some embodiments, the LMF may also deploy the machine learned or trained location inference model at the core network element. In some other embodiments, the LMF may generate an inference model based on the machine learned location inference model and transmit the generated inference a sub-location management function at the network element or the user equipment whose position is being determined. The position of the user device may be calculated by the network element or the user equipment respectfully based on the inference model and a ranging result report generated by the user equipment. Transferring the machine-learned location inference model to a sub-LMF for inference only reduces the overall transmission delay and transmission overhead while determining the position of the user equipment.

In an example embodiment, the trained or machine learned location inference model may be used in conjunction with the PRS and the SLRS to determine real-time position and/or location of the user device 103. The first user premise equipment 104-1 may report the distance between the user premise equipment 104-1 and the user device 103, along with other information to the core network element of the telecommunication network. The reported distance between the first user premise equipment 104-1 and the user device 103 may be correlated to the PRS transmitted by the network element to the user device 103. The position or location of the user device may be determined based on the reported distance between the first user premise equipment 104-1 and the user device 103 and information associated with the correlated PRS.

Figure 2:
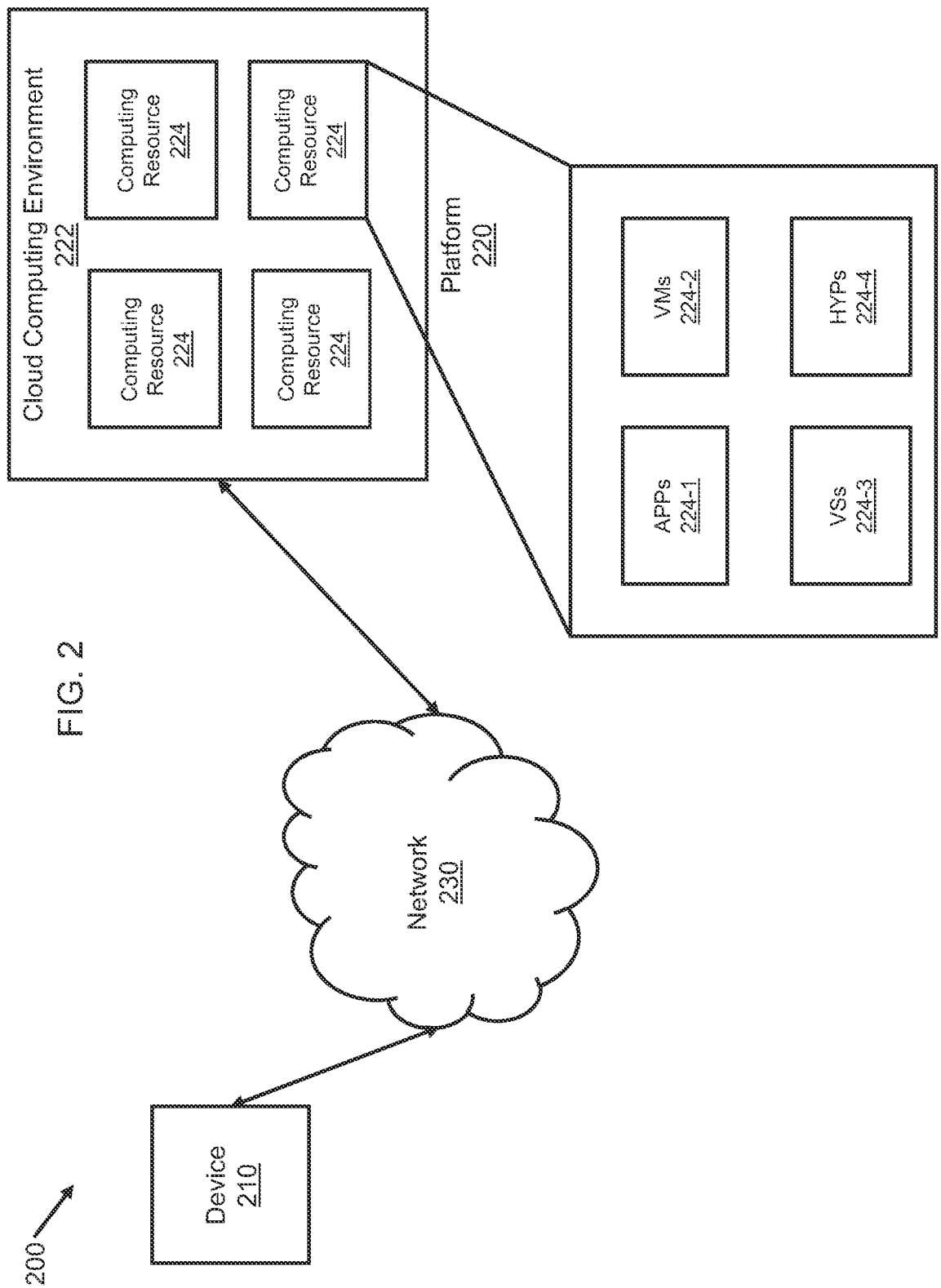
FIG. 2 is an example diagrammatic illustration of a component of the network architecture of FIG. 1, according to embodiments of the present disclosure.

FIG. 2 is a diagram of an example environment 200 in which systems and/or methods, described herein, may be implemented. As shown in FIG. 2, environment 200 may include a device 210, a platform 220, and a network 230. Devices of environment 200 may interconnect via wired connections, wireless connections, or a combination of wired and wireless connections. In embodiments, any of the functions of the elements included in the telecommunication network 100 may be performed by any combination of elements illustrated in FIG. 2.

Device 210 includes one or more devices capable of receiving, generating, storing, processing, and/or providing information associated with platform 220. For example, device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, device 210 may receive information from and/or transmit information to platform 220. In some embodiments device 210 may include network element 101, user premise equipment 104, user device 103, or AGV 102.

Platform 220 includes one or more devices capable of providing network services, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like. Application 224-1 includes one or more software applications that may be provided to or accessed by device 210. Application 224-1 may eliminate a need to install and execute the software applications on device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
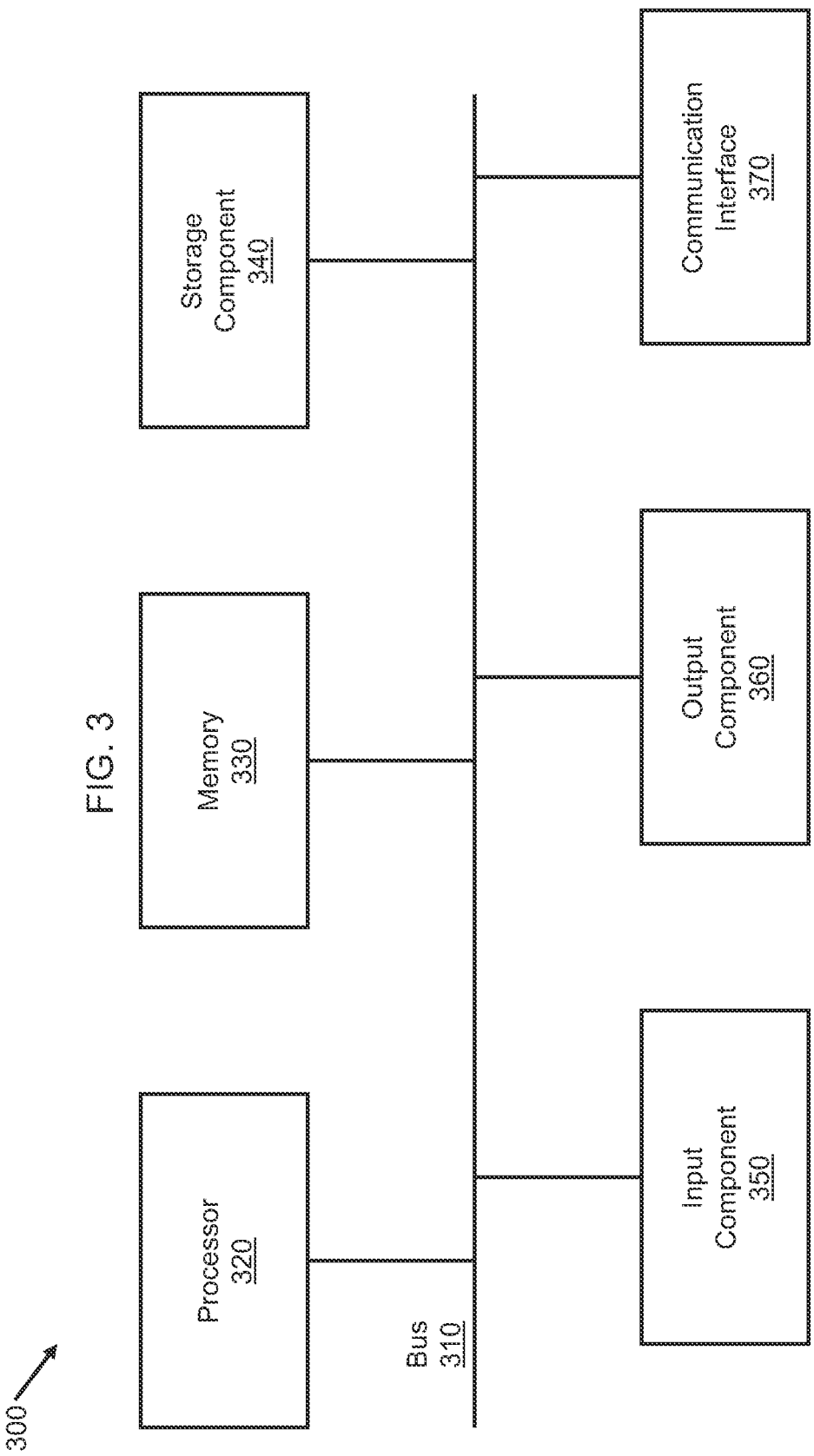
FIG. 3 is an example diagrammatic illustration of a component of the network architecture of FIG. 1, according to embodiments of the present disclosure.

FIG. 3 is a diagram of example components of a device 300. Device 300 may correspond to device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable storage medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the modules or components of FIG. 1 may be implemented by or using any one of the elements illustrated in FIGS. 2-3.

Figure 4:
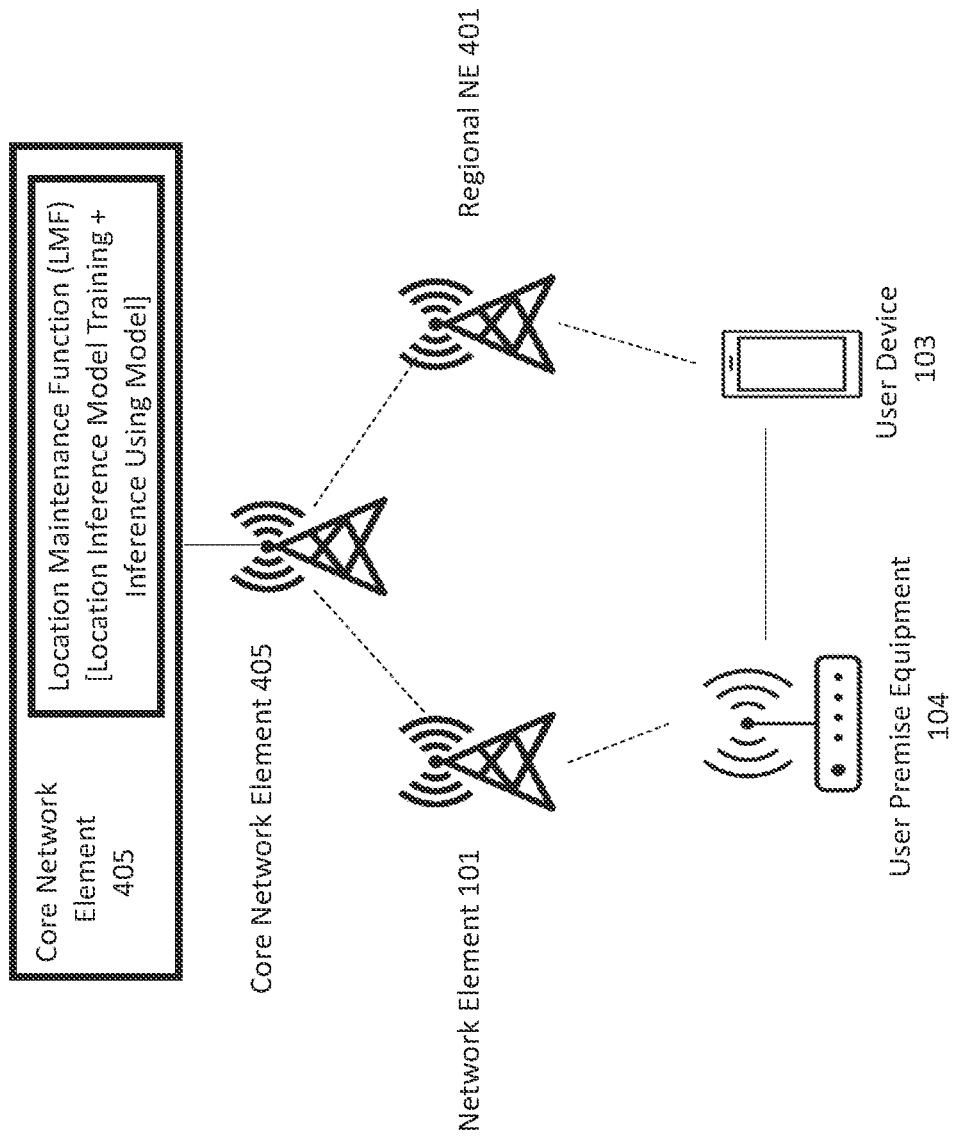
FIG. 4 is an example diagrammatic illustration of a network architecture in which the systems and/or methods described in the present disclosure may be implemented.
Figure 6:
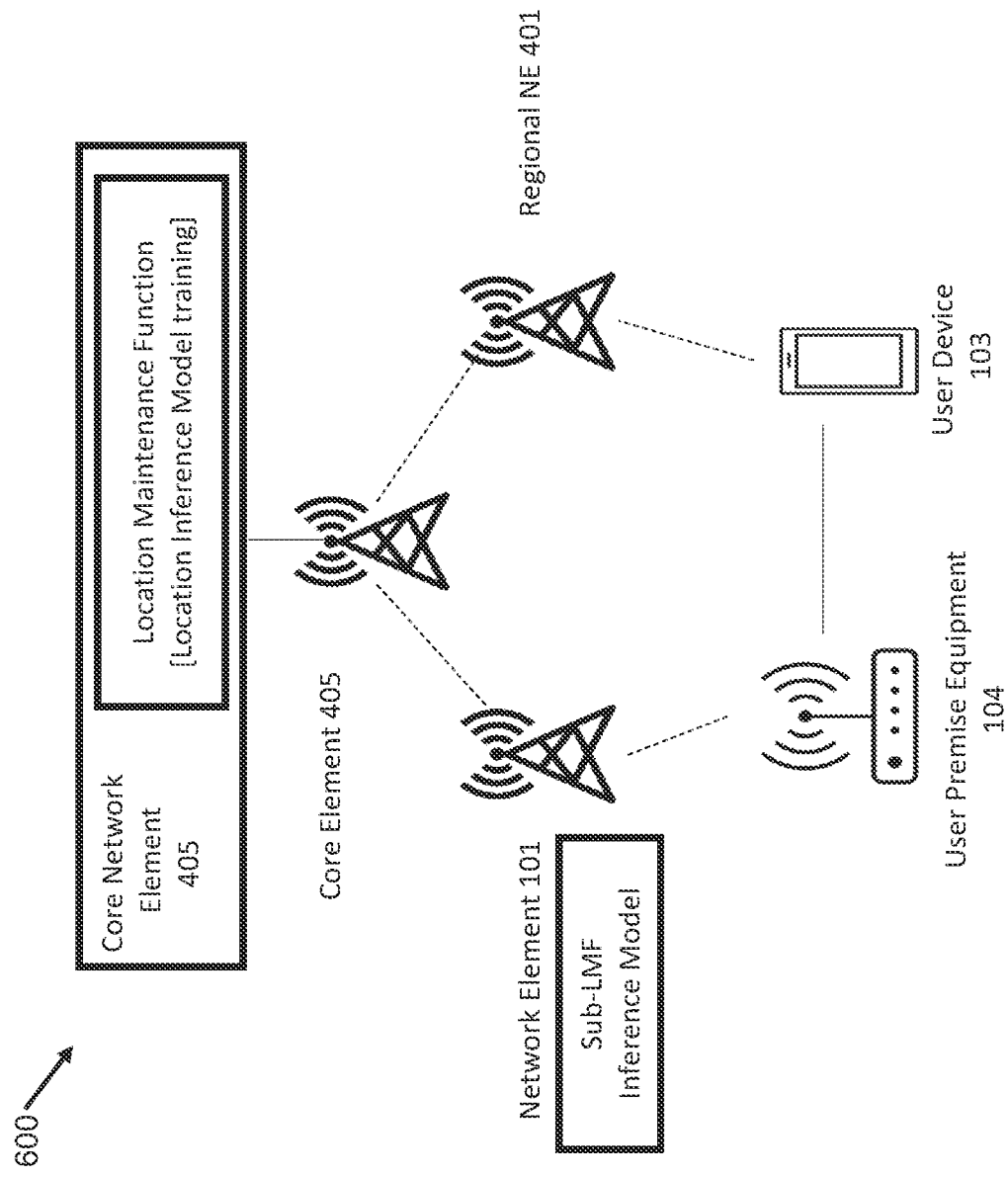
FIG. 6 is an example diagrammatic illustration of a network architecture in which the systems and/or methods described in the present disclosure may be implemented.
Figure 8:
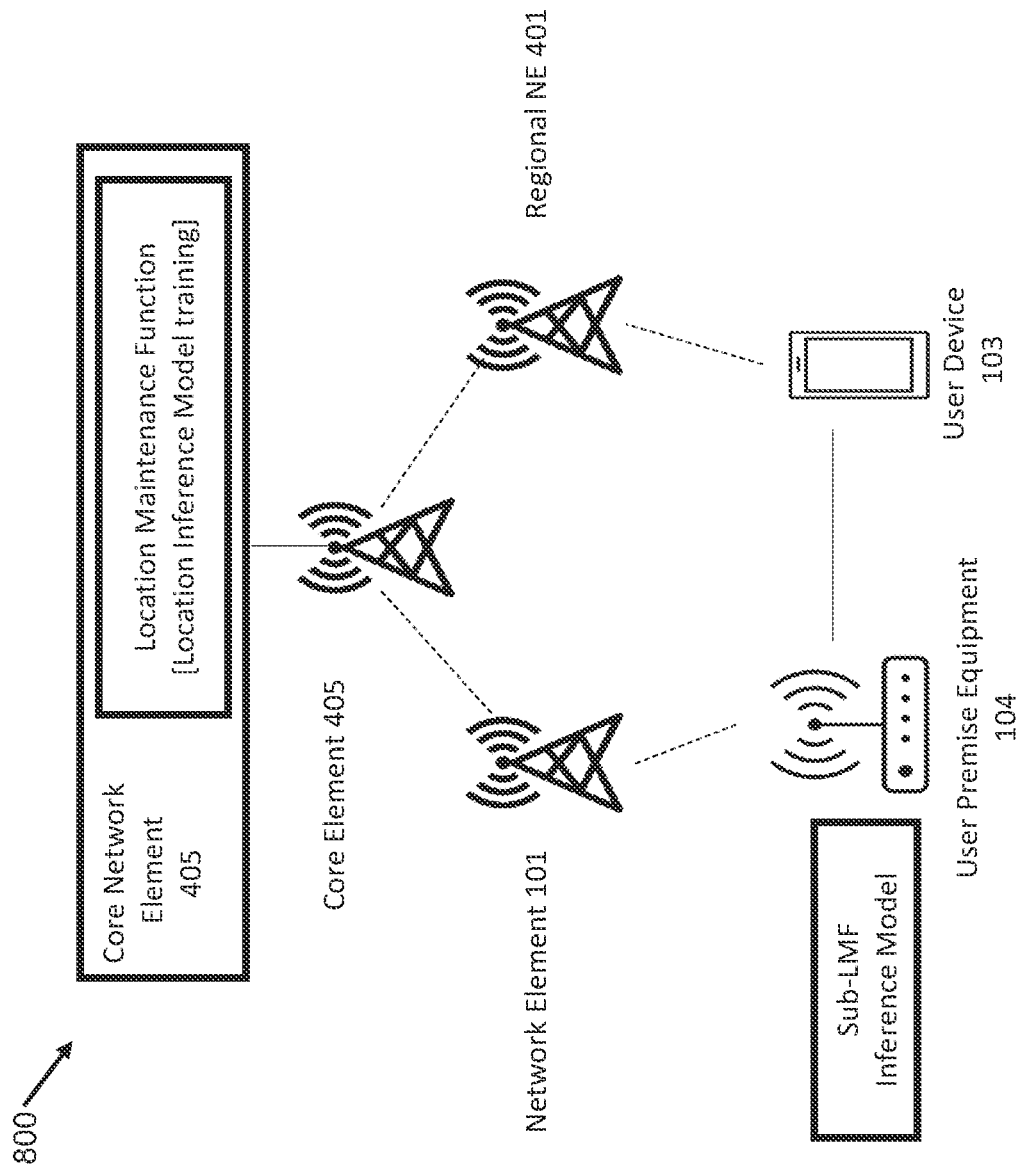
FIG. 8 is an example diagrammatic illustration of a network architecture in which the systems and/or methods described in the present disclosure may be implemented.

FIGS. 4, 6, and 8 are exemplary diagrammatic illustrations of a network architecture for adaptive positioning accuracy of user equipment in a telecommunication network.

As shown in FIG. 4, a telecommunication network 400 may include a network element 101, a core network element 405, a regional network element 401, user premise equipment 104, and user device 103.

In an embodiment, the LMF may be included in the core network element. The LMF may be configured train the location inference model and deploy the trained location inference model at the core network element. The core network element may use the deployed machine learned location inference model to determine/calculate the position of the user equipment. In some embodiments, the core network element may use the ranging result report generated by the user equipment to determine/calculate the position of the user equipment.

As an example, the LMF may be located at the core network element 405, and the LMF be configured to train and deploy the trained location inference model at the core network element 405. Since the machine learned location inference model may be deployed at the core network element 405, the core network element 405 may determine the position of the user device 103 based on the machine learned location inference model. In some embodiments, the core network element 405 may determine the position of the user device based on a ranging result report generated by the user device 103 that the core network element 405 may receive from the user device 103.

Figure 5:
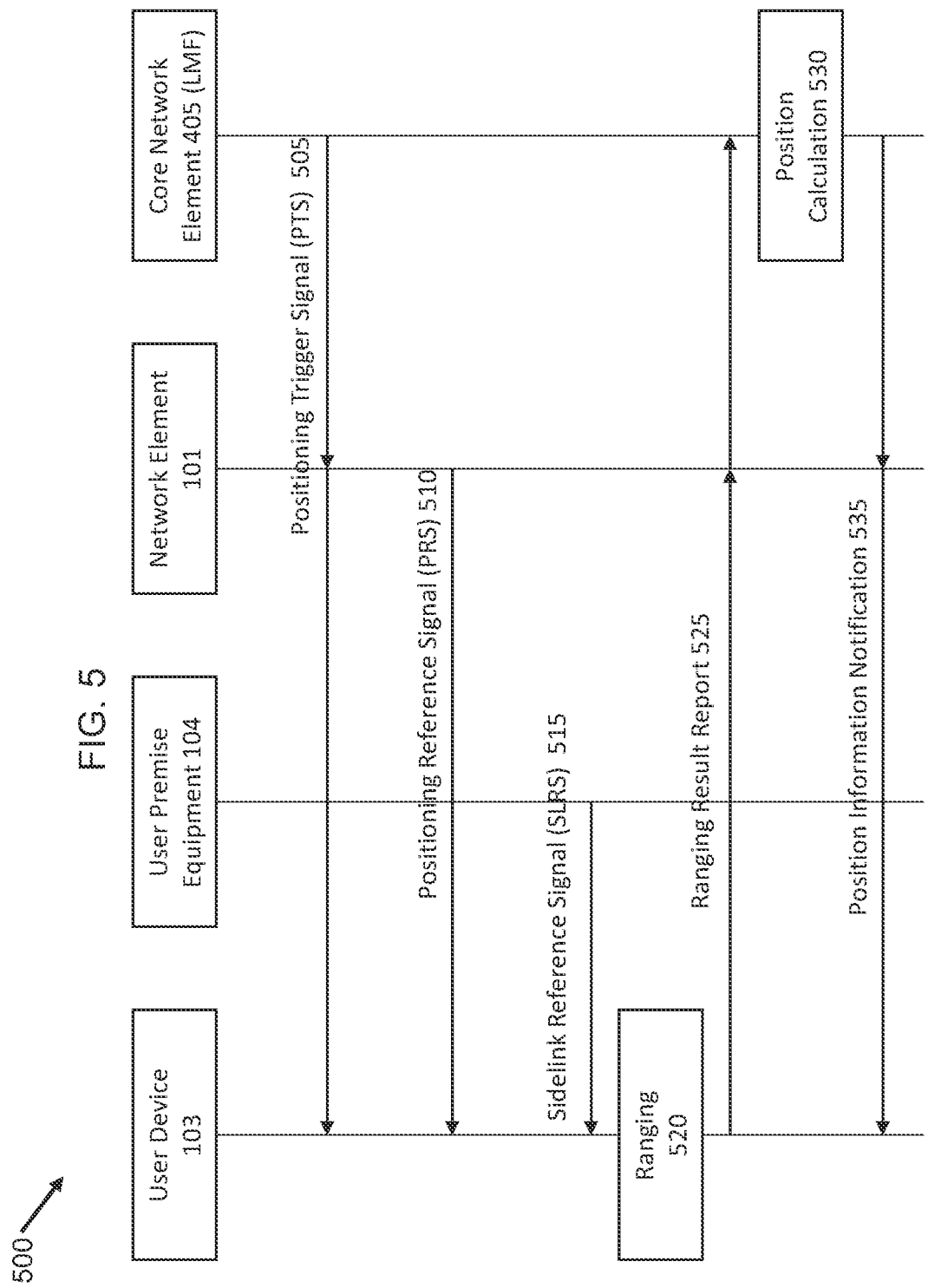
FIG. 5 is an example workflow diagram illustrating an example process for determining the position of a user device in a telecommunication network, according to embodiments of the present disclosure.

An exemplary workflow for determining the position of the user equipment when the LMF may be located at the core network element and the core network element calculates the position of the user equipment is illustrated in FIG. 5.

As seen in FIG. 5, a workflow process 500 may depict one or more operations for determining the position of the user equipment when the LMF may be located at the core network element and the core network element calculates the position of the user equipment.

At operation 505, the network element may transmit a positioning trigger signal (PTS) to the user equipment. In some embodiments, at 505, the network element may transmit the positioning trigger signal based on or subsequent to receiving an initial trigger signal from the core network element. The positioning trigger signal may be a broadcast signal indicating the beginning of process 500. In some embodiments, the positioning trigger signal may be the same as the initial trigger signal.

As an example, the network element 101 may transmit a positioning trigger signal to the user device 103. In some embodiments, the network element 101 may transmit the positioning trigger signal to the user device 103 based on or subsequent to receiving an initial trigger signal from the core network element 405.

At operation 510, the network element may transmit a positioning reference signal (PRS) to the user equipment. In some embodiments, the PRS may be transmitted in the same operation as the PTS. According to embodiments of the present disclosure, the PRS may include information relating to the PRS resources and resource sets, sequence ID information related to the PRS, or beam index as received by the user device related to the PRS (the user device to whom the PRS may be transmitted). In some embodiments, the PRS may also include a transaction ID, the transaction ID associated with a time of position measurement or user device whose position is being determined and/or calculated. At mentioned above, embodiments of the present disclosure are directed to utilizing a combination of PRS and SLRS to determine the position of the user equipment/user device. To ensure that the signals associated with the same user equipment/user device are being used to determine the position, a correlation may be needed between the PRS and the SLRS associated with the same device.

As an example, the network element 101 may transmit a PRS to the user device 103. In some embodiments, the PRS may include a first transaction ID that may be used to correlate the PRS and the SLRS. In an embodiment, the first transaction ID may be associated with a time at which the position measurement was triggered. In some other embodiments, the first transaction ID may be associated with the user device 103 whose position is being determined.

At operation 515, the user premise equipment may transmit a sidelink reference signal (SLRS) to the user equipment whose position is being determined. To ensure that the signals associated with the same user equipment/user device are being used to determine the position of the user equipment/user device, a correlation between the PRS and the SLRS or a correlated positioning reference signal information may be needed or signaled. In some embodiments, the SLRS may include a transaction ID, the transaction ID associated with a time of position measurement or user device whose position is being determined and/or calculated. In some other embodiments, the SLRS may include a correlated PRS information comprising information associated with the PRS that was transmitted by the network element to the user equipment.

As an example, user premise equipment 104 may transmit a SLRS to the user device 103. In some embodiments, the SLRS may include a second transaction ID that may be used to correlate the PRS and the SLRS. In an embodiment, the second transaction ID may be associated with a time at which the position measurement was triggered. In some other embodiments, the second transaction ID may be associated with the user device 103 whose position is being determined.

At operation 520, the user equipment may generate a ranging result report based on the SLRS. In some embodiments, the ranging result report may include one or more distance calculations between the user equipment and the user premise equipment based on the SLRS. The ranging result report may include a correlated positioning reference signal information, wherein the correlated positioning reference signal information may include information associated with a positioning reference signal having a first transaction ID same as a second transaction ID associated with the sidelink reference signal. In some embodiments, the first transaction ID and second transaction ID are associated with a same time of position measurement or a same user device. In some embodiments, the ranging result report may include reference signal received power (RSRP), received signal strength indicator (RSSI), reference signal received quality (RSRQ), and/or beam information associated with the received SLRS. The RSRP, RSSI, RSRQ, and/or the beam index may be used to measure the distance or directionality between the user equipment and the user premise equipment.

At operation 525, the user equipment may transmit the generated ranging result report to the core network element. As an example, the user device 103 may transmit the ranging result report to the core network element 405.

At operation 530, the core network element may determine and/or calculate the position of the user equipment based on the ranging result report and a machine learned location inference model. According to some embodiments of the present disclosure, the location management function (LMF) may be located at the core network element, and may be configured to train and deploy the trained location inference model. Since the machine learned location inference model may be deployed at the core network element, the core network element may use it to determine and/or calculate the position of the user equipment. The determined and/or calculated position of the user equipment may be an initial location of the user equipment or an updated and/or revised location of the user equipment. In some embodiments, the position and/or location of the user equipment, as determined by the core network element, may be an absolute location of the user equipment (e.g., geographic coordinates) or may be a relative location of the user equipment with respect to the core network element or with respect to the nearest network element.

As an example, the core network element 405 may determine and/or calculate the position of the user device 103 based on the ranging result report received from the user device 103 and a machine learned location inference model trained and deployed by the LMF at the core network element 405.

At operation 535, the core network element and/or the network element may transmit the determined position of the user equipment throughout the telecommunication network as needed.

Referring now to FIG. 6, as shown in FIG. 6, a telecommunication network 600 may include a network element 101, a core network element 405, a regional network element 401, user premise equipment 104, and user device 103.

In an embodiment, the LMF may be included in the core network element. However, the LMF may only be configured to train the location inference model based on data generated throughout the telecommunication network. Therefore, the core network element may only include the model-training phase of the location inference model. The core network may generate an inference model based on the machine learned location inference model trained by the LMF. The core network element may transmit the inference model to low layer nodes of the telecommunication network 600. Moving the generated inference model to the lower layer may reduce positioning latency and reduce the network traffic load to collect the information for learning. In some embodiments, the network element may receive the ranging result report from the user equipment. The network element may use the inference model and the ranging result report to determine and/or calculate the position of the user equipment.

As an example, the core network element 405 may transmit the inference model to a sub-LMF at the network element 101, wherein the network element 101 may only apply not train the transferred inference model and determine the position of the user device 103. Since the inference model may be located in the sub-LMF in the network element 101, the network element 101 may determine the position of the user device 103 based on the transferred inference model. In some embodiments, the network element 101 may determine the position of the user device 103 based on a ranging result report generated by the user device 103 that the network element 101 may receive from the user device 103.

Figure 7:
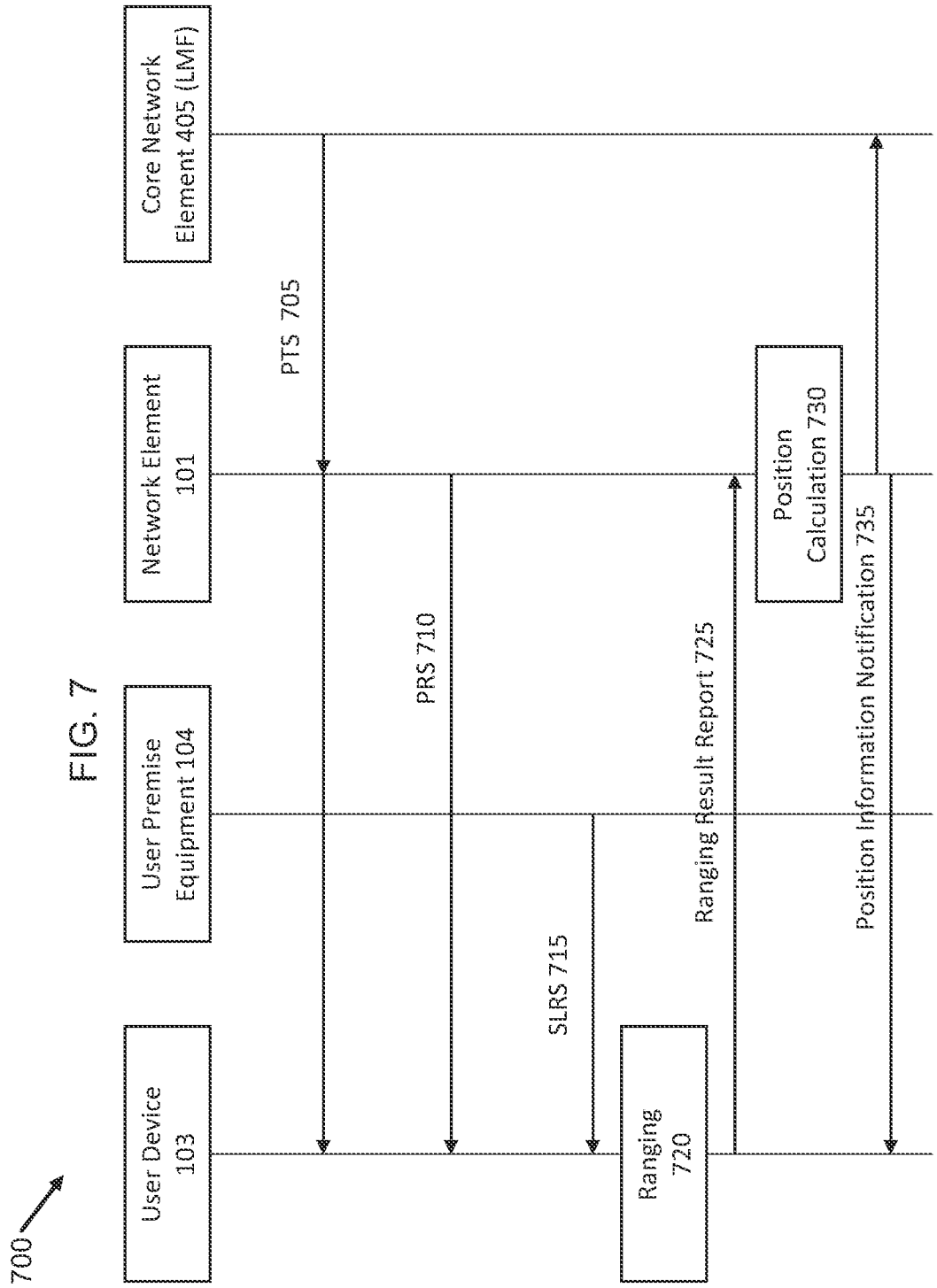
FIG. 7 is an example workflow diagram illustrating an example process for determining the position of a user device in a telecommunication network, according to embodiments of the present disclosure.

An exemplary workflow for determining the position of the user equipment when the LMF may be located at the core network element and but the network element calculates the position of the user equipment is illustrated in FIG. 7.

As seen in FIG. 7, a workflow process 700 may depict one or more operations for determining the position of the user equipment when the LMF may be located at the core network element and the network element calculates the position of the user equipment.

Operations 705-720 of workflow process 700 are similar to operations 505-520 of workflow process 500.

At operation 725, the user equipment may transmit the generated ranging result report to the network element. Therefore, in contrast to operation 525, the ranging result report may be transmitted to the network element. As an example, the user device 103 may transmit the ranging result report to the network element 101.

At operation 730, the network element may determine and/or calculate the position of the user equipment based on the ranging result report and a transferred inference model, the transferred inference model being based on the machine learned location inference model. According to some embodiments of the present disclosure, the location management function (LMF) may be located at the core network element, and may be configured to train the location inference model. However, the LMF may be configured to generate an inference model based on the machine learned location inference model. The core network element may transfer only the inference model to the network element. Since the inference model may be used to determine the position of the user equipment, and that inference model may be deployed at the network element, the network element may use it to determine and/or calculate the position of the user equipment. The determined and/or calculated position of the user equipment may be an initial location of the user equipment or an updated and/or revised location of the user equipment. In some embodiments, the position and/or location of the user equipment, as determined by the network element, may be an absolute location of the user equipment (e.g., real geographic coordinates) or may be a relative location of the user equipment with respect to the core network element or with respect to the nearest network element.

As an example, the network element 101 may determine and/or calculate the position of the user device 103 based on the ranging result report received from the user device 103 and the transferred inference model deployed at a sub-LMF included in the network element 101.

At operation 735, the network element may transmit the position of the user device determined by the network element to the core network element. The position of the user device may be based on the inference model and the ranging result report. In some embodiments, the network element may broadcast the position of the user device determined by the network element to the telecommunication network as needed.

Referring now to FIG. 8, as shown in FIG. 8, a telecommunication network 800 may include a network element 101, a core network element 405, a regional network element 401, user premise equipment 104, and user device 103.

In an embodiment, the LMF may be included in the core network element. However, the LMF may only be configured to train the location inference model based on data generated throughout the telecommunication network. Therefore, the core network element may only include the model-training phase of the location inference model. The core network may generate an inference model based on the machine learned location inference model trained by the LMF. The core network element may transmit the inference model to low layer nodes of the telecommunication network 600. Moving the generated inference model to the lower layer may reduce positioning latency and reduce the network traffic load to collect the information for learning. As an example, the core network element may transmit the inference model the user equipment whose position is being determined in the telecommunication network 600

In some embodiments, the user equipment may generate the ranging result report and the user equipment may calculate its own position using the ranging result report and the transferred inference model.

As an example, the core network element 405 may transmit the inference model to a sub-LMF at the user device 103, wherein the user device 103 may only apply not train the transferred inference model and determine its own position. Since the inference model may be located in the sub-LMF in the user device 103, the user device 103 may determine its own position based on the transferred inference model. In some embodiments, the user device 103 may determine its own position based on its own ranging result report.

An exemplary workflow 900 for determining the position of the user equipment when the LMF may be located at the core network element and but the user equipment calculates the position of the user equipment is illustrated in FIG. 9.

As seen in FIG. 9, a workflow process 900 may depict one or more operations for determining the position of the user equipment when the LMF may be located at the core network element and the user equipment calculates its own position.

Operations 905-915 of workflow process 900 are similar to operations 505-515 of workflow process 500, and operations 705-715 of workflow process 700.

At operation 920, the user equipment may generate a ranging result report based on the SLRS. In some embodiments, the ranging result report may include one or more distance calculations between the user equipment and the user premise equipment based on the SLRS. The ranging result report may include a correlated positioning reference signal information, wherein the correlated positioning reference signal information may include information associated with a positioning reference signal having a first transaction ID same as a second transaction ID associated with the sidelink reference signal. In some embodiments, the first transaction ID and second transaction ID are associated with a same time of position measurement or a same user device. In some embodiments, the ranging result report may include reference signal received power (RSRP), received signal strength indicator (RSSI), reference signal received quality (RSRQ), and/or beam information associated with the received SLRS. The RSRP, RSSI, RSRO, and/or the beam index may be used to measure the distance or directionality between the user equipment and the user premise equipment.

At operation 920, in some embodiments, the ranging result report generated by the user equipment may include determination and/or calculation of its own position based on its ranging result report and a transferred inference model, the transferred inference model being based on the machine learned location inference model. According to some embodiments of the present disclosure, the location management function (LMF) may be located at the core network element, and may be configured to train the location inference model. However, the LMF may be configured to generate an inference model based on the machine learned location inference model. The core network element may transfer only the inference model to the user equipment. Since the inference model may be used to determine the position of the user equipment, and that inference model may be deployed at the user equipment, the user equipment determines its own location using the ranging result report and the inference model.

The determined and/or calculated position of the user equipment may be an initial location of the user equipment or an updated and/or revised location of the user equipment. In some embodiments, the position and/or location of the user equipment, as determined by the user equipment itself, may be an absolute location of the user equipment (e.g., geographic coordinates) or may be a relative location of the user equipment with respect to the core network element or with respect to the nearest network element.

As an example, the user device 103 may generate its own ranging result report, and also determine and/or calculate its own position based on the ranging result report that the user device 103 generated itself and the transferred inference model based on the trained location inference model.

At operation 955, the user equipment may transmit its determined position throughout the telecommunication network as needed. As an example, user device 103 may transmit its determined location throughout the telecommunication network as needed.

FIG. 10 is an exemplary flowchart illustrating an example process 1000 for determining the position of a user device in a telecommunication network, according to embodiments of the present disclosure.

According to embodiments, operation 1010 may include, transmitting, by a network element of the telecommunication network to a user device, a positioning trigger signal and a positioning reference signal. In some embodiments, the positioning trigger signal may be transmitted by the network element on receipt of an initial trigger signal from the core network element of the telecommunication network.

According to embodiments, operation 1015 may include transmitting, by a user premise equipment to the user device, a sidelink reference signal to the user device. Any known format or protocol may be used to generate and configure the sidelink reference signal.

According to embodiments, operation 1020 may include receiving, by the network element, a ranging result report, the ranging result report calculated by the user device including a distance and a timing information associated with signals received by the user device. In some embodiments, the ranging result report may be calculated by the user device, and may include a distance calculation between the user device and the user premise equipment based on the sidelink reference signal and a correlated positioning reference signal information.

The correlated positioning reference signal information may include information associated with a positioning reference signal having a first transaction ID same as a second transaction ID associated with the sidelink reference signal. In some embodiments, the first transaction ID and the second transaction ID may be associated with a time of position measurement or the user device. According to embodiments, the ranging result report may include one or more of time lag between transmission and receipt of the sidelink reference signal between the user device and the user premise equipment, position information related to the user premise equipment, power information related to the user device, power information related to the user premise equipment, time of arrival of the sidelink reference signal, or angle information related to a reception of the sidelink reference signal. According to embodiments of the present disclosure, the ranging result report may also include signal information related to the positioning reference signal, including at least one of a sequence ID information related to the positioning reference signal and beam index as received by the user device related to the positioning reference signal.

According to embodiments, operation 1025 may include transmitting, by the network element to a core network element of the telecommunication network, a position of the user device, the position of the user device may be based on a machine learned location inference model and the ranging result report. According to embodiments, the machine learned location inference model may be trained using a location management function, wherein the location management function may be part of the core network element.

In some embodiments, an inference model may be based on the machine learned location inference model may be transmitted to a sub-location management function at the network element, and wherein the position of the user device may be calculated by the network element based on the inference model and the ranging result report. In some other embodiments, the inference model based on the machine learned location inference model may be transmitted to a sub-location management function at the user device, wherein the position of the user device may be calculated by the user device based on the inference model and the ranging result report, and the ranging result report may be calculated by the user device may further includes the position of the user device.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for adaptive positioning accuracy of devices in a telecommunication network, the method being performed by one or more processors, the method comprising:

transmitting, by a network element of the telecommunication network to a user device, a positioning trigger signal and a positioning reference signal;

transmitting, by a user premise equipment to the user device, a sidelink reference signal to the user device;

receiving, by the network element, a ranging result report, the ranging result report calculated by the user device including at least one of a distance and a timing information associated with signals received by the user device; and transmitting, by the network element to a core network element of the telecommunication network, a position of the user device, wherein the position of the user device is based on a machine learned location inference model and the ranging result report, wherein the positioning trigger signal is transmitted by the network element based on receipt of an initial trigger signal from the core network element of the telecommunication network, wherein the initial trigger signals triggers start of process to determine the position of the user device by triggering transmission of the positioning trigger signal and the positioning reference signal to the user device, and wherein the ranging result report, calculated by the user device, comprises a distance calculation between the user device and the user premise equipment based on the side link reference signal and a correlated positioning reference signal information, wherein the correlated positioning reference signal information comprises information associated with a positioning reference signal having a first transaction ID same as a second transaction ID associated with the sidelink reference signal, and wherein the first transaction ID and the second transaction ID are associated with a time of position measurement or the user device.

2. The method of claim 1, wherein the positioning trigger signal is transmitted by the network element is different from the initial trigger signal from the core network element of the telecommunication network.

3. The method of claim 1, wherein the machine learned location inference model is trained using a location management function, wherein the location management function is part of the core network element.

4. The method of claim 3, wherein an inference model based on the machine learned location inference model is transmitted to a sub-location management function at the network element, and wherein the position of the user device is calculated by the network element based on the inference model and the ranging result report.

5. The method of claim 3, wherein an inference model based on the machine learned location inference model is transmitted to a sub-location management function at the user device, wherein the position of the user device is calculated by the user device based on the inference model and the ranging result report, and wherein the ranging result report calculated by the user device further includes the position of the user device.

6. The method of claim 1, wherein the ranging result report further includes one or more of: time lag between transmission and receipt of the sidelink reference signal between the user device and the user premise equipment, position information related to the user premise equipment, power information related to the user device, power information related to the user premise equipment, time of arrival of the sidelink reference signal, or angle information related to a reception of the sidelink reference signal.

7. The method of claim 6, wherein the ranging result report further includes signal information related to the positioning reference signal, including at least one of a sequence ID information related to the positioning reference signal and beam index as received by the user device related to the positioning reference signal.

8. The method of claim 3, wherein the machine learned location inference model is trained specifically for adaptive indoor positioning of the user device.

9. The method of claim 3, wherein the machine learned location inference model is trained using sidelink channel measurement, estimated positioning of the user device, position of the user premise equipment, the positioning reference signal, and the timing information associated with the signals received by the user device.

10. The method of claim 1, the position of the user device including a location of the user device or a revised location of the user device.

11. An apparatus for adaptive positioning accuracy of devices in a telecommunication network, the apparatus comprising:
at least one memory configured to store computer program code; and
at least one processor configured to access the computer program code and operate as instructed by the computer program code, the computer program code including:
first transmitting code configured to cause a first processor of the at least one processor to transmit a positioning trigger signal and a positioning reference signal, the first processor being a part of a network element;
second transmitting code configured to cause a second processor of the at least one processor to transmit a sidelink reference signal to a user device, the second processor being a part of a user premise equipment;
first receiving code configured to cause the first processor to receive a ranging result report, the ranging result report calculated by the user device including a distance and a timing information associated with signals received by the user device; and
third transmitting code configured to cause the first processor to transmit a position of the user device, wherein the position of the use device is based on a machine learned location inference model and the ranging result report,
wherein the positioning trigger signal is transmitted by the network element based on receipt of an initial trigger signal from the core network element of the telecommunication network,
wherein the initial trigger signals triggers start of process to determine the position of the user device by triggering transmission of the positioning trigger signal and the positioning reference signal to the user device, and
wherein the ranging result report, calculated by the user device, comprises a distance calculation between the user device and the user premise equipment based on the sidelink reference signal and a correlated positioning reference signal information, wherein the correlated positioning reference signal information comprises information associated with a positioning reference signal having a first transaction ID same as a second transaction ID associated with the sidelink reference signal, and wherein the first transaction ID and the second transaction ID are associated with a time of position measurement or the user device.

12. The apparatus of claim 11, wherein the machine learned location inference model is trained using a location management function, wherein the location management function is a part of a core network element.

13. The apparatus of claim 12, wherein an inference model based on the machine learned location inference model is transmitted to a sub-location management function at the network element, and wherein the position of the user device is calculated by the first processor based on the inference model and the ranging result report.

14. The apparatus of claim 12, wherein an inference model based on the machine learned location inference model is transmitted to a sub-location management function at the user device, wherein the position of the user device is calculated by the user device based on the inference model and the ranging result report, and wherein the ranging result report calculated by the user device further includes the position of the user device.

15. A non-transitory computer readable medium storing a program causing a computer system to execute a process, the process comprising:
- transmitting, by a network element of a telecommunication network to a user device, a positioning trigger signal and a positioning reference signal;
- transmitting, by a user premise equipment to the user device, a sidelink reference signal to the user device;
- receiving, by the network element, a ranging result report, the ranging result report calculated by the user device including a distance and a timing information associated with signals received by the user device; and
- transmitting, by the network element to a core network element of the telecommunication network, a position of the user device, wherein the position of the user device is based on a machine learned location inference model and the ranging result report,
- wherein the positioning trigger signal is transmitted by the network element based on receipt of an initial trigger signal from the core network element of the telecommunication network,
- wherein the initial trigger signals triggers start of process to determine the position of the user device by triggering transmission of the positioning trigger signal and the positioning reference signal to the user device, and
- wherein the ranging result report, calculated by the user device, comprises a distance calculation between the user device and the user premise equipment based on the side link reference signal and a correlated positioning reference signal information, wherein the correlated positioning reference signal information comprises information associated with a positioning reference signal having a first transaction ID same as a second transaction ID associated with the sidelink reference signal, and wherein the first transaction ID and the second transaction ID are associated with a time of position measurement or the user device.

16. The non-transitory computer readable medium of claim 15, wherein the machine learned location inference model is trained using a location management function, wherein the location management function is part of the core network element.

17. The non-transitory computer readable medium of claim 16, wherein an inference model based on the machine learned location inference model is transmitted to a sub-location management function at the network element, and wherein the position of the user device is calculated by the network element based on the inference model and the ranging result report.

18. The non-transitory computer readable medium of claim 16, wherein an inference model based on the machine learned location inference model is transmitted to a sub-location management function at the user device, wherein the position of the user device is calculated by the user device based on the inference model and the ranging result report, and wherein the ranging result report calculated by the user device also include the position of the user device.

* * * * *